3,576,747
DRY CLEANING SOLVENT CONTAINING A BLEACH

Wilhelm E. Walles, Midland, and Elton D. Prueter, Saginaw, Mich., assignors to The Dow Chemical Company, Midland, Mich.
No Drawing. Filed Sept. 9, 1968, Ser. No. 758,610
Int. Cl. C11d 7/54
U.S. Cl. 252—104                              4 Claims

ABSTRACT OF THE DISCLOSURE

This application relates to drycleaning solvents containing N-bromo or chloro-N-alkyl carboxamides, or the N-chloro and N-bromo derivatives of 2-oxazolidinone, 2-morpholinone and 2-oxazinidinone as bleaching agents.

BACKGROUND OF THE INVENTION

Compounds having the formula such as

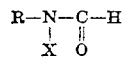

wherein each R is the same or different alkyl radical having chlorine are very active and easily reduced. They are too unstable, however, to be used as bleaching agents in commercial drycleaning solvents.

SUMMARY OF THE INVENTION

The products of this invention are drycleaning solvents containing (1) carboxamide compounds having the formula

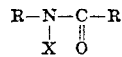

wherein each R is the same or different alkyl radical having from 1 to 8 carbon atoms or (2) carboxamide compounds having the formula

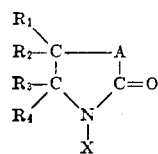

wherein A is —O—, —$(CH_2)_n$— wherein $n=1$–3, —$CH_2O$—, or $OCH_2$; X is chlorine or bromine; $R_1$ and $R_3$ are each hydrogen, alkyl of 1–4 carbon atoms or phenyl; and $R_2$ and $R_4$ are each hydrogen or alkyl of 1–4 carbon atoms.

Useful carboxamide compounds include, for example, the N-halo-N-alkyl carboxamides such as N-chloro-N-methyl acetamide, N-chloro-N-butyl butyramide, N-chloro-N-methyl caprylamide and N-bromo-N-propyl capro-amide; the N-halo-2-oxazolidinones such as N-chloro-5-methyl - 2 - oxazolidinone, N-bromo - 5 - methyl - 2 - oxazolidinone, N-chloro-5-ethyl-2-oxazolidinone, and N-chloro-2-oxazolidinone; the N-halo-3-morpholinones such as N-chloro-3-morpholinone; the N-halocaprolactams such as N-chlorocaprolactam; the N-halo - 2-pyrrolidinones such as N-chloro-2-pyrrolidinone, and the N-halo-2-imidazolidinones such as N-chloro - 4-imidazolidinone. Such compounds are readily prepared by reacting the nonhalogenated carboxamide with a halogenated isocyanuric acid as illustrated in copending application Ser. No. 679,227 filed Oct. 30, 1967, by W. E. Walles and entitled "Trans-halogenation of Imides." These compounds are relatively stable to autooxidation and have been found to be eminently suitable for use as bleaching agents in drycleaning solvents. The active compounds as well as the residue remaining after they have been employed as the bleaching agent are very soluble in the common drycleaning solvents.

DESCRIPTION OF THE PREFERRED EMBODIMENTS

The preferred carboxamide compounds to employ in the compositions of this invention are those wherein each R is methyl or ethyl, the most preferred compound being N-chloro-N-methyl acetamide. The N-chloro-N-alkyl carboxamides may be prepared by reacting trichlorocyanuric acid with the desired N-alkyl carboxamide at temperatures of about 40° to 60° C., and they may be purified by distillation or other known means.

The invention is further illustrated by the following example.

Example

N-chloro-N-methyl acetamide (B.P. 43–44° C. at 25 mm. pressure) was prepared by reacting 73 grams (1.0 mol) of N-methyl acetamide with 77 grams (0.33 mol) of trichlorocyanuric acid at 40° to 52° C. The product was purified by distillation at atmospheric pressure.

A solution of 4% by weight of N-chloro-N-methyl acetamide in methyl chloroform containing in addition 2% by weight of water was heated to 60° C. and a 2" square piece of unbleached cotton cloth was left in 50 cc. of the heated solution for one hour. The cotton was bleached white.

A similar test was carried out using freshly prepared paper from a sulfite pulp which had been prebleached by the chlorine extraction system. Before treatment the paper was grayish tan and after bleaching for one hour it was slightly off-white.

Similar results are obtained by employing N-chloro-N-ethyl acetamide, N-chloro-N-propyl acetamides, the N-chloro-N-butyl acetamides, N-chloro-5-methyl-2-oxazolidinone, N-chloro - 5-ethyl - 2-oxazolidinone, N-chloro-2-oxazolidinone, N-chloro-3-morpholine, N-chlorocaprolactam, N-chloro - 2-pyrrolidinone, chloro-4-methyl-2-imidazolidinone and N-bromo-5-methyl-2-oxazolidinone, and the like.

The bleaching agents of this invention are very soluble and effective in all of the common drycleaning and degreasing solvents such as, for example, methylene chloride, perchloroethylene, trichloroethylene, carbon tetrachloride, and the like.

We claim:
1. A drycleaning composition consisting essentially of a solvent selected from the group consisting of methylene chloride, perchloroethylene, trichloroethylene, carbon tetrachloride or methylchloroform and a bleaching agent in a bleaching amount of a compound having the formula

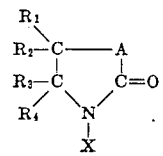

wherein each R is the same or different alkyl radical having from 1 to 8 carbon atoms, X is chlorine or bromine, A is —O—, —$(CH_2)_n$— wherein $n$ is 1–3, —$CH_2O$— or —$OCH_2$; $R_1$ and $R_3$ are each hydrogen or alkyl of 1–4 carbon atoms and $R_2$ and $R_4$ are each hydrogen or alkyl or 1–4 carbon atoms.

2. Process for bleaching cotton which comprises treating said cotton with a solvent selected from the group consisting of methylene chloride, perchloroethylene, trichloroethylene, carbon tetrachloride and methylchloroform, said solvent consisting essentially of a bleaching agent in a bleaching amount of a compound having the formula

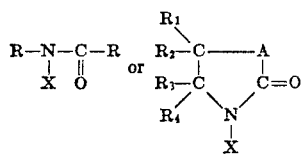

wherein each R is the same or different alkyl radical having from 1 to 8 carbon atoms, X is chlorine or bromine, A is —O—, —$(CH_2)_n$— wherein $n$ is 1–3, —$CH_2O$ or —$OCH_2$; $R_1$ and $R_3$ are each hydrogen or alkyl or 1–4 carbon atoms and $R_2$ and $R_4$ are each hydrogen or alkyl of 1–4 carbon atoms.

3. Process of claim 2 wherein the bleaching agent employed is N-chloro-N-methyl acetamide.

4. Process of claim 3 wherein the solvent is methylchloroform.

References Cited

Chem. Abstracts, vol. 64, 11123a–11123h, April 1966.

MAYER WEINBLATT, Primary Examiner

U.S. Cl. X.R.

252—99; 8—111, 142

PO-1050
(5/69)

UNITED STATES PATENT OFFICE
CERTIFICATE OF CORRECTION

Patent No. 3,576,747          Dated 27 April 1971

Inventor(s) Wilhelm E. Walles and Elton D. Prueter

It is certified that error appears in the above-identified patent and that said Letters Patent are hereby corrected as shown below:

In column 1, line 24, delete "each R is the same or different alkyl radical hav-" and insert -- R is an alkyl group and X is either bromine or --. In line 62, change "4-imidazolidinone" to -- 4-methyl-2-imidazolidinone --.

Signed and sealed this 31st day of August 1971.

(SEAL)
Attest:

EDWARD M. FLETCHER, JR.
Attesting Officer

WILLIAM E. SCHUYLER, JR.
Commissioner of Patents